US011365464B2

(12) United States Patent
Kim et al.

(10) Patent No.: US 11,365,464 B2
(45) Date of Patent: Jun. 21, 2022

(54) METHOD FOR PREPARING MAGNETIC POWDER AND MAGNETIC MATERIAL

(71) Applicant: LG Chem, Ltd., Seoul (KR)

(72) Inventors: Ingyu Kim, Daejeon (KR); Soon Jae Kwon, Daejeon (KR); Ikjin Choi, Daejeon (KR); Hyounsoo Uh, Daejeon (KR)

(73) Assignee: LG Chem, Ltd.

(*) Notice: Subject to any disclaimer, the term of this patent is extended or adjusted under 35 U.S.C. 154(b) by 186 days.

(21) Appl. No.: 16/644,342

(22) PCT Filed: Aug. 14, 2019

(86) PCT No.: PCT/KR2019/010375
§ 371 (c)(1),
(2) Date: Mar. 4, 2020

(87) PCT Pub. No.: WO2020/045865
PCT Pub. Date: Mar. 5, 2020

(65) Prior Publication Data
US 2021/0047711 A1  Feb. 18, 2021

(30) Foreign Application Priority Data

Aug. 31, 2018  (KR) .................. 10-2018-0103628

(51) Int. Cl.
*B22F 9/04*  (2006.01)
*C22C 33/02*  (2006.01)
(Continued)

(52) U.S. Cl.
CPC ............ *C22C 33/0278* (2013.01); *B22F 1/16* (2022.01); *B22F 9/04* (2013.01); *B22F 9/20* (2013.01);
(Continued)

(58) Field of Classification Search
None
See application file for complete search history.

(56) References Cited

U.S. PATENT DOCUMENTS 5,057,148 A * 10/1991 Micheli .................. C22C 1/0441
75/351
5,064,465 A    11/1991 Chen et al.
(Continued)

FOREIGN PATENT DOCUMENTS

CN    1436625 A    8/2003
CN    105761861 A   7/2016
(Continued)

OTHER PUBLICATIONS

Extended European Search Report with Written Opinion for Application No. 19848743.7 dated Apr. 22, 2020, 9 pages.
(Continued)

*Primary Examiner* — George Wyszomierski
(74) *Attorney, Agent, or Firm* — Lerner, David, Littenberg, Krumholz & Mentlik, LLP

(57) ABSTRACT

A method of producing a magnetic powder and a magnetic powder is provided. The method of producing a magnetic powder according to an exemplary embodiment of the present disclosure includes: producing an iron powder by a reduction reaction of iron oxide, producing a magnetic powder using a molded body obtained by press molding a mixture including the iron powder, a rare earth oxide, boron, and calcium at a pressure of 22 MPa or more, and coating a surface of the magnetic powder with ammonium fluoride.

14 Claims, 12 Drawing Sheets

(51) Int. Cl.
  *B22F 9/20*  (2006.01)
  *H01F 1/057*  (2006.01)
  *B22F 1/16*  (2022.01)

(52) U.S. Cl.
  CPC ...... *H01F 1/0571* (2013.01); *B22F 2009/043* (2013.01); *B22F 2201/10* (2013.01); *B22F 2301/355* (2013.01); *B22F 2998/10* (2013.01); *C22C 2202/02* (2013.01)

(56) References Cited

U.S. PATENT DOCUMENTS

| | | | |
|---|---|---|---|
| 2011/0186181 | A1 | 8/2011 | Niinae et al. |
| 2012/0114515 | A1 | 5/2012 | Kaneko et al. |
| 2012/0145944 | A1* | 6/2012 | Komuro ............ H01F 41/0293 252/62.51 R |
| 2013/0344428 | A1* | 12/2013 | Koyama ............ G03G 9/0836 430/106.2 |
| 2014/0241929 | A1 | 8/2014 | Ozaki et al. |
| 2016/0086704 | A1 | 3/2016 | Namkung et al. |
| 2019/0292635 | A1 | 9/2019 | In et al. |
| 2021/0047711 | A1 | 2/2021 | Kim et al. |

FOREIGN PATENT DOCUMENTS

| | | |
|---|---|---|
| CN | 106252010 A | 12/2016 |
| CN | 111163885 A | 5/2020 |
| GB | 1318965 A | 5/1973 |
| JP | S63249305 A | 10/1988 |
| JP | H03072011 A | 3/1991 |
| JP | H04247813 A | 9/1992 |
| JP | H10280002 A | 10/1998 |
| JP | 2000034502 A | 2/2000 |
| JP | 2004043979 A | 2/2004 |
| JP | 2006002187 A | 1/2006 |
| JP | 2009260290 A | 11/2009 |
| JP | 2011082467 A | 4/2011 |
| JP | 2012151259 A | 8/2012 |
| JP | 5573663 B2 | 8/2014 |
| JP | 2017226885 A | 12/2017 |
| KR | 20140082741 A | 7/2014 |
| KR | 20150033423 A | 4/2015 |
| KR | 20180051224 A | 5/2018 |
| WO | 2010001878 A2 | 1/2010 |
| WO | 2018088709 A1 | 5/2018 |

OTHER PUBLICATIONS

International Search Report for Application No. PCT/KR2019/010375 dated Dec. 2, 2019, 11 pages.

Yun, et al., "Effect of Process Temperature on the Sm2Fe17 Alloying Process During a Reduction-Diffusion Process Using Fe Nanopowder", Kor. J. Met. Mater., Jul. 5, 2010, pp. 995-1002, vol. 48, No. 11, English Translation of Abstract Included Only.

Search Report dated Mar. 1, 2022 from the Office Action for Chinese Application No. 201980004641.5 dated Mar. 3, 2022, 3 pages.

* cited by examiner

METHOD FOR PREPARING MAGNETIC POWDER AND MAGNETIC MATERIAL

CROSS-REFERENCE TO RELATED APPLICATION

The present application is a National Phase entry under 35 U.S.C. § 371 of International Application No PCT/KR2019/010375 filed Aug. 14, 2019 which claims priority from Korean Patent Application No. 10-2018-0103628 filed Aug. 31, 2018, the entire contents of which are incorporated herein by reference.

TECHNICAL FIELD

The present invention relates to a method of producing a magnetic powder and a magnetic powder. More specifically, the present invention relates to a method of producing a NdFeB-based magnetic powder and a sintered magnet produced by the method.

BACKGROUND ART

A NdFeB-based magnet is a permanent magnet having a composition of $Nd_2Fe_{14}B$ which is a compound of Nd which is a rare earth element, iron, and boron (B), and has been used as an universal permanent magnet for 30 years since it was developed in 1983. The NdFeB-based magnet is used in various fields such as electronic information, automobile industries, medical devices, energy, and transportation. Particularly, keeping up with a recent weight lightening and downsizing trend, the NdFeB-based magnet is used in products such as craft tools, electronic information appliance, electrical home appliance, mobile phones, robot motors, wind power generators, small motors for automobiles, and drive motors.

As general production of the NdFeB-based magnet, a strip/mold casting or melt spinning method based on melt powder metallurgy is known. First, a strip/mold casting method is a process of melting a metal such as neodymium (Nd), iron (Fe), and boron (B) by heating to produce an ingot, coarsely pulverizing crystal grain particles, and producing micro particles by a refining process. These processes are repeated to obtain a powder, which is subjected to pressing and sintering under a magnetic field to produce an anisotropic sintered magnet.

In addition, a melt spinning method is melting metal elements, quenching the melt by pouring the melt to a wheel rotating at a high speed, performing jet mill pulverization, and then performing blending into a polymer to form a bond magnet or performing pressing to produce a magnet.

However, there are problems in that these methods all essentially require pulverizing process, it takes a long time to perform the pulverizing process, and a process of coating a powder surface after pulverization is required. In addition, since conventional $Nd_2Fe_{14}B$ micro particles are produced by coarsely pulverizing a mass obtained by melting (1500-2000° C.) and quenching a raw material and subjecting the mass to a multistep process of coarse pulverization and hydrogen decrepitation/jet mill, a particle shape is irregular and particle refinement is limited.

Recently, a method of producing a magnetic powder by a reduction-diffusion process has received attention. For example, uniform NdFeB fine particles may be produced by the reduction-diffusion process in which $Nd_2O_3$, Fe, and B are mixed and reduced by Ca or the like. However, since this method uses a micro iron powder (mainly carbonyl iron powder) as a starting material, it is impossible to produce magnetic particles having a size smaller than the iron particles, and since the micro iron powder is high priced, production costs are high.

In addition, the NdFeB-based magnet may be produced by sintering a magnetic powder at a high temperature of about 1000 to 1200° C., and when the magnetic powder is sintered at the temperature, crystal growth of particles may occur, relative to a powder size. The particle size growth may cause decreased coercive force.

In order to avoid the problems, as a method of suppressing particle growth during sintering, there are a resynthesis method by hydrogenation, disproportionation, desorption and recombination (HDDR) processes, a method of forming micro crystal grains by a hot deformation method.

However, though the coercive force of the sintered magnetic may be secured to some extent by various methods as described above, the process itself is very complicated and the effect of suppressing particle growth during sintering is still poor. In addition, since a microstructure is greatly changed by particle migration and the like, another problem arises, such as a decrease in sintered magnet characteristics and a decrease in magnetic characteristics due to added elements.

DISCLOSURE

Technical Problem

The present invention has been made in an effort to provide a method of producing a magnetic powder having advantages of reducing process costs when producing a magnetic powder by a reduction-diffusion process, then suppressing crystal growth of particles when sintering the magnetic powder, so that the magnetic powder has a high coercive force characteristics, and a magnetic powder produced by the method.

However, the problems to be solved by the exemplary embodiments of the present invention are not limited to the above, and may be variously extended within a range of technical idea included in the present invention.

Technical Solution

An exemplary embodiment of the present invention provides a method of producing a magnetic powder including: producing an iron powder by a reduction reaction of iron oxide, producing a magnetic powder using a molded body obtained by press molding a mixture including the iron powder, a rare earth oxide, boron, and calcium at a pressure of 22 MPa or more, and coating a surface of the magnetic powder with ammonium fluoride.

The method of producing a magnetic powder may further include, before the step of coating a surface of the magnetic powder with ammonium fluoride, mixing the magnetic powder, ammonium nitrate, methanol, and zirconia balls and pulverizing the mixture.

The step of producing an iron powder may include reducing a mixture of at least one of an alkali metal oxide or an alkaline earth metal oxide with iron oxide under an inert gas atmosphere, in the presence of a reducing agent.

The mixture including the iron powder, the rare earth oxide, the boron, and the calcium may be produced by adding the neodymium oxide, the boron, and the calcium to the iron powder.

The step of producing an iron powder may include reducing a mixture of neodymium oxide and iron oxide which has been wet-mixed under an organic solvent, in the presence of a reducing agent to produce an iron powder and neodymium oxide-containing mixture.

The mixture including the iron powder, neodymium oxide, boron, and calcium may be produced by adding the boron and the calcium to the iron powder and neodymium oxide-containing mixture.

A reducing agent is used in the reduction reaction of the iron oxide, and the reducing agent may include at least one of an alkali metal hydride and an alkaline earth metal hydride.

The step of producing an iron powder may further include removing a by-product from the iron powder obtained by a reduction reaction using a quaternary ammonium-based methanol solution and cleaning the iron powder from which the by-product has been removed with a solvent and drying the cleaned iron powder.

The step of producing a magnetic powder may be performed by a reduction-diffusion process.

The step of producing a magnetic powder may include heating the molded body at a temperature of 800° C. to 1,100° C. under an inert gas atmosphere.

The press-molded body may be produced using a pressing process selected from the group consisting of oil-hydraulic pressing, tapping, and cold isostatic pressing (CIP).

The step of producing a magnetic powder may further include pulverizing the molded body to obtain a powder and then removing a by-product using a quaternary ammonium-based methanol solution, and cleaning the powder from which the by-product has been removed with a solvent and drying the cleaned powder.

As the quaternary ammonium-based methanol solution, a $NH_4NO_3$—MeOH solution, a $NH_4Cl$—MeOH solution, or a $NH_4Ac$—MeOH solution may be used.

The step of coating ammonium fluoride may include mixing the magnetic powder and the ammonium fluoride in an organic solvent and drying the mixture.

The step of mixing and drying may include mixing the magnetic powder, the ammonium fluoride, and the organic solvent and pulverizing the mixture in a Turbula mixer.

The organic solvent may include at least one of acetone, methanol, ethanol, butanol, and normal hexane.

The magnetic powder according to another exemplary embodiment of the present invention may be produced by the method described above.

Advantageous Effect

According to the exemplary embodiments, the iron powder is not added separately and used as in the past, but the iron powder provided by a reduction reaction of iron oxide is used to provide the magnetic powder by a reduction-diffusion process. Accordingly, a particle shape of the magnetic powder produced by an exemplary embodiment of the present invention is regular and may be provided as ultrafine particles having a submicrometer size, and simultaneously, since a high-priced fine iron powder is not used, production process costs may be reduced.

In addition, a fluoride coated film is formed on a particle surface of the magnetic powder, whereby the crystal growth of the magnetic powder particles in a sintering process may be suppressed to a size level of an initial powder, and the magnetic powder having a high density may be produced by a lubrication action of the fluoride coated on the particle surface of the magnetic powder in a molding process before sintering.

MODE FOR INVENTION

Figure 1:
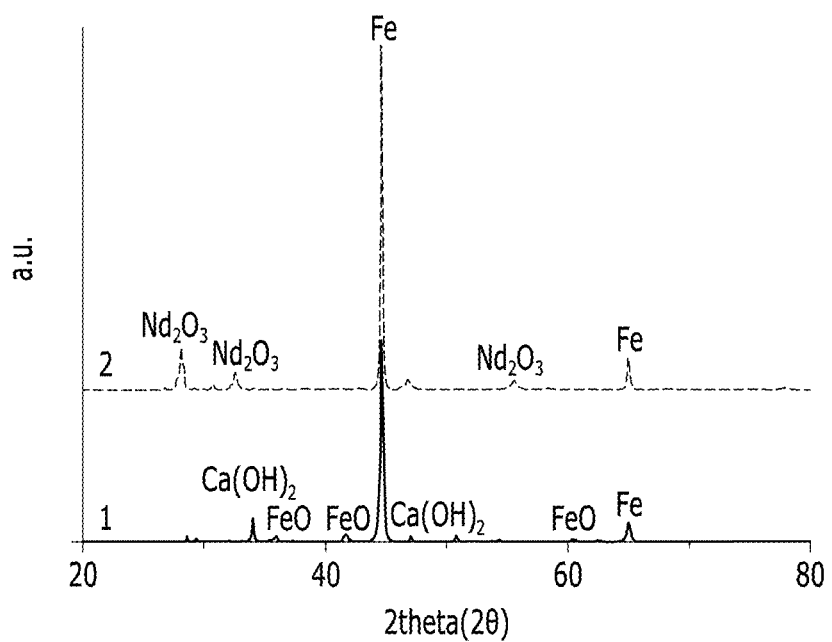
FIG. 1 is a graph illustrating XRD patterns of iron powders after reducing iron oxide ($Fe_2O_3$) according to Examples 1 and 2 of the present invention.

Hereinafter, various exemplary embodiments of the present invention will be described in detail referring to the attached drawings, so that a person skilled in the art to which the present invention pertains may easily carry out the present invention. The present invention may be implemented in various forms, which are not limited to the exemplary embodiments descried herein.

In addition, unless explicitly described to the contrary, the word "comprise" and variations such as "comprises" or "comprising", will be understood to imply the inclusion of stated elements but not the exclusion of any other elements.

As described above, conventionally, $Nd_2Fe_{14}B$ particles of 2 to 3 μm were able to be obtained only when a mass obtained by melting and quenching a raw material was necessarily subjected to a coarse pulverization and a hydrogen decrepitation/jet mill process during production of the magnetic powder.

However, since in the present invention, the magnetic particles may be produced by a reduction-diffusion process using an iron powder in which iron oxide has been reduced without a conventional multistep pulverization process, process efficiency may be increased as compared with the conventional method.

In addition, since in the reduction-diffusion process, a micro iron powder such as a carbonyl iron powder is used, it was impossible to produce iron powder particles having a submicrometer size. Here, a submicrometer size refers to a size of 1 micrometer or less. However, the present invention has a characteristic of using an iron powder obtained by reducing iron oxide in the reduction-diffusion process, and also since the iron powder has a submicrometer size, ultrafine magnetic particles may be finally produced.

In addition, a conventional metallurgical method and the reduction-diffusion process using an iron powder have high production costs due to the use of the high-priced iron powder, but according to the present invention, the costs may be reduced by using iron oxide as a raw material.

The method of producing a magnetic powder according to an exemplary embodiment of the present invention includes producing an iron powder by a reduction reaction of iron oxide and producing a magnetic powder by heating a molded body obtained by press molding a mixture including the iron powder, neodymium oxide, boron, and calcium at a pressure of 22 MPa or more.

Hereinafter, the method of producing a magnetic powder of the present invention will be described in more detail.

The step of producing an iron powder in the present invention may use a process selected from the following two methods, for a reduction reaction of iron oxide.

In the method of producing a magnetic powder according to the first embodiment of the present invention, the step of producing an iron powder may include reducing a mixture of at least one of an alkali metal oxide or an alkaline earth metal oxide with iron oxide under an inert gas atmosphere, in the presence of a reducing agent. Preferably, a material to be mixed with the iron oxide may be any one of alkaline earth metal oxides, and for example, calcium oxide may be used.

The mixture including an iron powder, neodymium oxide, boron, and calcium may be produced by adding the neodymium oxide, the boron, and the calcium to the iron powder.

In the method of producing a magnetic powder according to the second embodiment of the present invention, the step of producing an iron powder may include reducing a mixture of neodymium oxide and iron oxide which has been wet-mixed under an organic solvent, in the presence of a reducing agent to produce an iron powder and neodymium oxide-containing mixture.

The mixture including an iron powder, neodymium oxide, boron, and calcium may be produced by adding the boron and the calcium to the iron powder and neodymium oxide-containing mixture.

Particularly, the step of reducing iron oxide for producing an iron powder is characterized by being carried out under a high pressure condition at a high temperature.

Here, when a high pressure is not applied in the step of heating the mixture of neodymium oxide, boron, iron, and a reducing agent at a high temperature, by-products such as CaO are present in a large amount in the mixture, thereby preventing progress of the reduction reaction.

Accordingly, in the present invention, pressurization is performed in certain range of high pressure condition at a high temperature during the reduction reaction of iron oxide, thereby solving the problem that particles do not diffuse well due to the large amount of by-products to produce the magnetic powder smoothly. Preferably, in the first embodiment and second embodiment, the pressure applied to the mixture may be 22 MPa or more. When the pressure applied to the mixture is less than 22 MPa, particles do not diffuse well to prevent progress of the reaction. Here, when the condition of equivalent to or more than the lower limit of the pressure is satisfied, a synthesis reaction for forming the magnetic powder by sufficient diffusion of particles may occur. More preferably, the pressure may be 35 MPa or more.

As the pressure is increased, diffusion of particles is sufficiently increased, so that the synthesis reaction may proceed well. In Examples 1, 2, 3, and 4 described later, it may be confirmed that the synthesis reaction may proceed well also under the pressurization conditions of 100 MPa, 150 MPa, and 200 MPa, in addition to the pressure value of 35 MPa. However, it is not preferred that the pressure value to be pressurized is increased indefinitely. That is to say, in the first embodiment and second embodiment, when the pressure applied to the mixture is more than 200 MPa, the powder mixed in the process of applying a pressure becomes nonuniform, which may also prevent the progress of the reaction. This will be described by Comparative Example 2 described later.

The method of producing a magnetic powder according to the present exemplary embodiment will be described in more detail. Since an alkali metal hydride or an alkaline earth metal hydride is used as a reducing agent, an alkali metal oxide or an alkaline earth metal oxide is produced in the step of reducing iron oxide, and these oxides functions as a by-product. Due to the presence of an excessive amount of the oxide, the reaction of producing a magnetic powder may not proceed under a normal pressure or under a pressure lower or excessively higher than the original place.

However, in the Example according to the present invention, since the mixture is press-molded before being heated, under a high pressure like the above numerical range, together with the use of the reducing agent such as $CaH_2$, the problem due to the by-products produced in an excessive amount may be solved.

Here, the process of removing the by-product may be carried out by performing a washing and removal process twice or once depending on the step of the reduction reaction selected from the first embodiment or second embodiment. That is, in the first exemplary embodiment, the washing and removal process may proceed twice, and in the second embodiment, the washing and removal process may proceed once.

For example, in the first embodiment, iron oxide, calcium oxide, and the reducing agent are mixed and then an iron powder is produced, calcium oxide as a by-product is washed and removed, neodymium oxide and calcium are mixed, and the subsequent reduction synthesis step proceeds. Since the calcium oxide produced in this step should be washed and removed again, the washing and removing process of the by-product (CaO) in the first embodiment may proceed twice.

In addition, in the second embodiment, a mixture of neodymium oxide, iron oxide, and a reducing agent is reduced and boron and calcium are mixed without wash and removal of the by-product to proceed with the reduction synthesis step. The step of washing and removing a by-product proceeds after the synthesis reaction. Accordingly, the washing and removing a by-product according to the second embodiment may proceed once.

Here, in both the first embodiment and second embodiment, NdFeB sintered magnetic particles having excellent magnetism may be produced; however, when the number of processes is further decreased, oxidation of particles which may occur in the process of washing may be minimized, and the NdFeB magnetic particles may be better formed with uniform mixing of Nd and Fe, and thus, the second embodiment may proceed preferably. That is, in both the first embodiment and the second embodiment, a by-product may occur in the process of reducing iron oxide and in the process of synthesis, and in the first embodiment of the embodiments, since one of calcium oxide, an alkali metal oxide, and an alkaline earth metal oxide may be further added in the process of reducing iron oxide, the by-product of the first embodiment may be produced much more than the second embodiment. Accordingly, since the first embodiment may proceed during the synthesis reaction by performing the washing process in the middle of the reaction, it is preferred that the washing process proceeds twice. Further, in the second embodiment, the by-products are relatively small, and the synthesis may proceed without performing washing after the process of reducing iron oxide, and thus, the washing process may proceed only once.

In the first embodiment and second embodiment of the present invention, as the iron oxide, a material well known in the art may be used, and for example, ferrous oxide (FeO), ferric oxide ($Fe_2O_3$), or a mixed form thereof ($Fe_3O_4$) may be used.

A reducing agent is used in the reduction reaction of iron oxide, and as the reducing agent, an alkali metal hydride and/or an alkaline earth metal hydride may be used. Preferably, the reducing agent may be one or more selected from the group consisting of $CaH_2$, $NaH$, $MgH_2$, and $KH$.

In addition, the step of producing an iron powder according to the first embodiment may further include removing a by-product from the iron powder obtained by the reduction reaction using a quaternary ammonium-based methanol solution, and cleaning the iron powder from which the by-product has been removed with a solvent and drying the cleaned iron powder.

Specifically, since an alkali metal or alkaline earth metal oxide may be produced as a reduction by-product after the reduction reaction of iron oxide for producing the iron powder, it is preferred to remove the reduction by-product. Accordingly, in the present embodiment, the by-product is removed using a quaternary ammonium-based methanol solution, and then a solvent cleaning process and a drying process are performed to obtain the iron powder.

As the quaternary ammonium-based methanol solution, a $NH_4NO_3$—MeOH solution, a $NH_4Cl$—MeOH solution, or a $NH_4OAc$—MeOH solution may be used, and preferably a $NH_4NO_3$—MeOH solution may be used. In addition, the concentration of the solution may be 0.1 M to 2 M.

In the step of cleaning with a solvent, organic solvents such as alcohols such as methanol and ethanol, and acetone may be used, but the kind thereof is not limited thereto.

In addition, in the step of producing an iron powder according to the second embodiment, the organic solvent used for wet mixing may be an organic solvent such as ethanol, methanol, and acetone, but the kind thereof is not limited thereto. In this case, since the powder to be used is not dissolved in the solvent, any solvent may be used as long as the organic solvent is used to prepare the powder into the form of a dispersion or suspension.

Since the iron powder obtained by the process is produced in a fine size and may be directly used in the production process of the magnetic powder, a conventional high-priced iron powder having a micrometer unit size does not have to be used in the present invention. According to an exemplary embodiment of the present invention, the iron powder obtained by the reduction reaction of iron oxide may have a size of 0.1 μm to 1 μm.

Meanwhile, the step of producing a magnetic powder may be performed by a reduction-diffusion process. Here, as the reduction-diffusion process, any one selected from the following two methods described later may be used.

In the method of producing a magnetic powder according to the first embodiment of the present invention, the step of producing a magnetic powder by the reduction-diffusion process may include adding neodymium oxide, boron, and calcium to the iron powder produced by the reduction reaction of iron oxide to produce a mixture, press-molding the mixture at a pressure of 22 MPa or more to produce a molded body, and heating the molded body.

In the method of producing a magnetic powder according to the second embodiment of the present invention, the step of producing a magnetic powder by the reduction-diffusion process may include adding boron and calcium to a mixture including the iron powder produced by the reduction reaction of iron oxide and neodymium oxide to produce a mixture, press-molding the mixture at a pressure of 22 MPa or more to produce a molded body, and heating the molded body. As described above, in the second embodiment, the washing and removal process of the produced by-product (e.g., CaO) may be performed only once during the process, and thus, has merits of decreasing the number of processes as compared with the first embodiment in which the process should be performed twice, and mixing Nd and Fe uniformly so that NdFeB magnetic particles are formed better.

In the first embodiment and second embodiment, the step of heating a molded body may include heating the molded body at a temperature of 800° C. to 1,100° C. under an inert gas atmosphere.

The press-molded body may be produced using a pressing process selected from the group consisting of oil-hydraulic pressing, tapping, and cold isostatic pressing (CIP).

After the step of producing a magnetic powder, a step of pulverizing the synthesized molded body to obtain a powder and then removing a by-product using a quaternary ammonium-based methanol solution, and a step of cleaning the powder from which the by-product has been removed with a solvent, may be further included.

In the step of cleaning with the solvent, organic solvents such as alcohols, methanol, ethanol, and acetone may be used, but the kind thereof is not limited thereto.

As the quaternary ammonium-based methanol solution, a $NH_4NO_3$—MeOH solution, a $NH_4Cl$—MeOH solution, or a $NH_4Ac$—MeOH solution may be used, and preferably a $NH_4NO_3$—MeOH solution may be used. In addition, the concentration of the solution may be 0.1 M to 2 M.

In addition, the inert gas atmosphere in the present invention may be an Ar or He atmosphere.

In addition, in the step of producing an iron powder and the step of producing a magnetic powder, a drying process may be a vacuum drying process, but the method is not limited thereto.

In the first embodiment and second embodiment, a ball-mill, a Turbula mixer, or the like may be used for mixing each component.

In the step of producing an iron powder and the step of producing a magnetic powder, when the reduction reaction and the reduction-diffusion process are performed, an SUS tube may be used as the reactor thereof.

According to an exemplary embodiment of the present invention, a magnetic powder produced by the method described above may be provided.

Since the magnetic powder is produced by the reduction-diffusion process using a fine iron powder produced by the reduction reaction of iron oxide, a powder of which the size may be finely adjusted and which as a regular particle shape may be provided.

Preferably, the magnetic powder is a NdFeB powder, and may include a $Nd_2Fe_{14}B$ powder having a size of 1.2 μm to 3.5 μm, 1.3 μm to 3.1 μm, or 2 μm to 3 μm.

Meanwhile, the method of producing a magnetic powder according to an exemplary embodiment of the present invention includes coating a surface of the magnetic powder with ammonium fluoride ($NH_4F$).

The step of coating ammonium fluoride may include dissolving inorganic ammonium fluoride in an organic solvent, coating the magnetic powder with the dissolved ammonium fluoride, and drying the coated powder. More specifically, the step may include mixing the magnetic powder, the ammonium fluoride, and the organic solvent, and pulverizing the mixture in a Turbula mixer.

In addition, the kind of organic solvent is not particularly limited as long as it dissolves the organic fluoride, but the organic solvent may include at least one of acetone, methanol, ethanol, butanol, and normal hexane.

The present exemplary embodiment may further include mixing ammonium nitrate, methanol, and zirconia balls with the magnetic powder before coating the ammonium fluoride and pulverizing the mixture. The ammonium nitrate may have a function of removing a remaining calcium compound.

Meanwhile, the magnetic powder coated with ammonium fluoride ($NH_4F$) may be sintered to produce a sintered magnet.

A sintering process may include adding a sintering aid such as $NdH_2$ to the magnetic powder coated with ammonium fluoride and performing homogenization, adding the homogenized mixed powder to a graphite mold and performing compression, applying a pulse magnetic field for orientation to produce a molded body for a sintered magnet. The molded body for a sintered magnet is heated to a temperature of 1070° C. to 1090° C. in a vacuum atmosphere to produce a NdFeB sintered magnet. By the Ca reduction-diffusion, the process of producing a $Nd_2Fe_{14}B$ alloy powder has a merit of simplifying a conventional multistep process to reduce production costs. However, sinterability may be deteriorated due to a relatively high oxygen content. In order to solve the problem, according to the present exemplary embodiment, a Nd hydrate (hydride) is added to produce a sintered magnet.

When the sintering proceeds, crystal grain growth necessarily follows, and the crystal grain growth functions as a factor of decreasing the coercive force.

In order to suppress the crystal grain growth occurring in the sintering process, a fluoride powder and the like may be mixed with the magnetic powder, but when the fluoride is not evenly distributed in the magnetic powder so that diffusion of the fluoride does not sufficiently occur during heating, the crystal grain growth in the sintering process may not be sufficiently suppressed. However, in an exemplary embodiment of the present invention, ammonium fluoride is dissolved in an organic solvent and mixed with the magnetic powder instead of dry mixing of the fluoride, thereby forming a coated layer in which ammonium fluoride is evenly distributed on the surface of the magnetic powder. Since an ammonium fluoride coated layer is evenly distributed on the surface of the magnetic powder so that material diffusion is effectively suppressed, crystal grain growth in the sintering process may be limited to approximately the size of the initial magnetic powder, as compared with the otherwise case. Consequently, by limiting the crystal grain growth, a decrease in coercive force of the sintered magnet may be minimized.

A particle size of the crystal grain may be 0.5 to 5 µm.

In addition, a lubrication action is possible by the ammonium fluoride coated on the surface of the magnetic powder. The molded body for a sintered magnet having a high density may be manufactured by the lubrication action, and when the molded body for a sintered magnet is heated, it is possible to produce a NdFeB sintered magnet having high density and high performance.

Meanwhile, when heating for sintering, the magnetic powder and ammonium fluoride coated on the surface of the magnetic powder react, thereby forming a coated film of neodymium oxyfluoride in the interface of the crystal grain of the sintered magnet. Since neodymium oxyfluoride is formed by reaction with oxygen on the surface of the magnetic powder, oxygen diffusion into the magnetic powder may be minimized. Accordingly, a new oxidation reaction of magnetic particles is limited, corrosion resistance of the sintered magnet is improved, and unnecessary consumption of rare earth elements in production of an oxide may be suppressed.

Hereinafter, the method of producing a magnetic powder according to an exemplary embodiment of the present invention and the method of producing a sintered magnet will be described in more detail. However, the following Examples correspond to an illustration for describing the present invention, and the present invention is not limited to the Examples.

Example 1

10 g of $Fe_2O_3$, 9.45 g of $CaH_2$, and 10 g of CaO were mixed using a Turbula mixer. The mixture was placed in an SUS tube having an optional shape, and reacted in a tube electric furnace at 350° C. for 2 hours under an inert gas (Ar) atmosphere. After the reaction was completed, CaO as a by-product was removed using a 1M $NH_4NO_3$—MeOH solution, the mixture was washed with acetone, and then vacuum dried. 3.6 g of $Nd_2O_3$, 0.1 g of B, and 2.15 g of Ca were added to the dried sample, and remixed using a Turbula mixer. The mixture was molded by applying a pressure of 35 MPa using an oil-hydraulic press, placed in an SUS tube having an optional shape, and reacted in an electric furnace at 950° C. for an hour under an inert gas (Ar) atmosphere. After the reaction was completed, the sample was ground into a powder, CaO as a by-product was removed using a $NH_4NO_3$—MeOH solution, the sample was washed with acetone to finish a cleaning process, and vacuum dried, thereby obtaining a $Nd_2Fe_{14}B$ powder.

Example 2

13 g of $Nd_2O_3$ and 27 g of $Fe_2O_3$ were wet-mixed uniformly using a ball-mill using ethanol, and then the mixture was dried at 900° C. for an hour under a vacuum atmosphere. 25.62 g of $CaH_2$ was further added thereto and remixed using a Turbula mixer. The mixture was placed in an SUS tube having an optional shape, and reacted in a tube electric furnace at 350° C. for 2 hours under an inert gas (Ar) atmosphere. 0.3 g of B and 5.5 g of Ca were further added to the sample after being reacted and remixed using a Turbula mixer.

The mixture was molded by applying a pressure of 35 MPa using an oil-hydraulic press, placed in an SUS tube having an optional shape, reacted by the method suggested in Example 1, and post-processed, thereby obtaining a $Nd_2Fe_{14}B$ powder.

Example 3

10.84 g of $Nd_2O_3$ and 30 g of $Fe_2O_3$ were wet-mixed uniformly using a ball-mill using ethanol, and the mixture was dried at 900° C. for an hour under a vacuum atmosphere. $CaH_2$ 28.5 g was further added to the dried sample and remixed using a Turbula mixer. The mixture was placed in an SUS tube having an optional shape, and reacted in a tube electric furnace at 350° C. for 2 hours under an inert gas (Ar) atmosphere. 0.3 g of B and 4.5 g of Ca were further added to the sample after being reacted and remixed using a Turbula mixer.

The mixture was molded by applying a pressure of 35 MPa using an oil-hydraulic press, placed in an SUS tube having an optional shape, reacted by the method suggested in Example 1, and post-processed, thereby obtaining a $Nd_2Fe_{14}B$ powder.

Example 4

6.1 g of $Nd_2O_3$ and 18.65 g of $Fe_3O_4$ were wet-mixed uniformly using a ball-mill using ethanol, and the mixture was dried at 900° C. for an hour under a vacuum atmosphere. 16.27 g of $CaH_2$ was further added to the dried sample and remixed using a Turbula mixer. The mixture was placed in an SUS tube having an optional shape, and reacted in an electric furnace at 350° C. for 2 hours under an inert gas (Ar) atmosphere. 0.19 g of B and 2.61 g of Ca were further added to the sample after being reacted and remixed using a turbula mixer. The mixture was molded by applying a pressure of 35 MPa using an oil-hydraulic press, placed in an SUS tube having an optional shape, reacted by the method suggested in Example 1, and post-processed, thereby obtaining a $Nd_2Fe_{14}B$ powder.

Example 5

Coating Magnetic Powder with Ammonium Fluoride (Heating Temperature of 1070° C.)

10 g of NdFeB-based magnetic powders obtained in Examples 1 to 4, 0.375 g of ammonium nitrate, 125 ml of methanol, and 50 g of zirconia balls having a diameter of 5 mm were placed in a sealed plastic bottle, and pulverized in a Turbula mixer for about 1 to 2 hours. Thereafter, ammonium nitrate and methanol were removed, and 0.05 g to 0.10 g of ammonium fluoride and 125 ml of methanol were added again, and mixture was pulverized for 1 to 2 hours and coated. By the method, a NdFeB-based magnetic powder having a particle size of 0.5 µm to 20 µm and being coated with ammonium fluoride was produced. 10 parts by weight (1 g) of a $NdH_2$ powder as a sintering aid was added to 100 parts by weight (10 g) of the NdFeB-based magnetic powder, a pulse magnetic field of 5 T or more was applied to orient the magnetic powder, and the powder was heated to a temperature of 1070° C. for 1 or 2 hours under a vacuum atmosphere to produce a NdFeB-based sintered magnet.

Example 6

Coating Magnetic Powder with Ammonium Fluoride (Heating Temperature of 1090° C.)

A magnetic powder was produced in the same manner as in Example 5, 10 parts by weight (1 g) of $NdH_2$ powder as a sintering aid was added to 100 parts by weight (10 g) of the NdFeB-based magnetic powder, a pulse magnetic field of 5 T or more was applied to orient the magnetic powder, and the powder was heated to a temperature of 1090° C. for 1 or 2 hours under a vacuum atmosphere to produce a NdFeB-based sintered magnet.

Comparative Example 1

10.84 g of $Nd_2O_3$ and 30 g of $Fe_2O_3$ were wet-mixed uniformly using a ball-mill using ethanol, and then the mixture was dried at 900° C. for an hour under a vacuum atmosphere. 28.5 g of $CaH_2$ was further added to the dried sample and remixed using a Turbula mixer. The mixture was placed in an SUS tube having an optional shape, and reacted in a tube electric furnace at 350° C. for 2 hours under an inert gas (Ar) atmosphere. 0.3 g of B and 4.5 g of Ca were further added to the sample after being reacted and remixed using a Turbula mixer. The mixture was molded by applying a pressure of 10 MPa using a tapping method, placed in an SUS tube having an optional shape, reacted by the method suggested in Example 1, and post-processed, thereby obtaining a $Nd_2Fe_{14}B$ powder.

Comparative Example 2

6.1 g of $Nd_2O_3$ and 18.65 g of $Fe_3O_4$ were wet-mixed uniformly using a ball-mill using ethanol, and then the mixture was dried at 900° C. for an hour under a vacuum atmosphere. 16.27 g of $CaH_2$ was further added to the dried sample, and remixed using a Turbula mixer. The mixture was placed in an SUS tube having an optional shape, and reacted in a tube electric furnace at 350° C. for 2 hours under an inert gas (Ar) atmosphere. 0.19 g of B and 2.61 g of Ca were further added to the sample after being reacted and remixed using a Turbula mixer. The mixture was molded by applying a pressure of 220 MPa using CIP, placed in an SUS tube having an optional shape, reacted by the method suggested in Example 1, and post-processed, thereby obtaining a $Nd_2Fe_{14}B$ powder.

Comparative Example 3

NdFeB-Based Mixed Powder which is not Coated with Ammonium Fluoride

A NdFeB-based magnetic powder was synthesized in the same manner as in Example 5, the residue was removed therefrom, 20 g of the magnetic powder and 100 g of zirconia balls having a diameter of 5 mm were placed in a sealed plastic bottle, and pulverized in a paint shaker for 40 minutes, thereby producing a NdFeB-based magnetic powder which has a particle diameter of 0.5 to 20 µm and is not coated. 10 parts by weight of a $NdH_2$ powder was added to 100 parts by weight of the NdFeB-based magnetic powder and homogenized. The homogenized mixture was heated under the same condition as in Example 5 to produce a NdFeB-based sintered magnet.

Experimental Example 1

Figure 2:
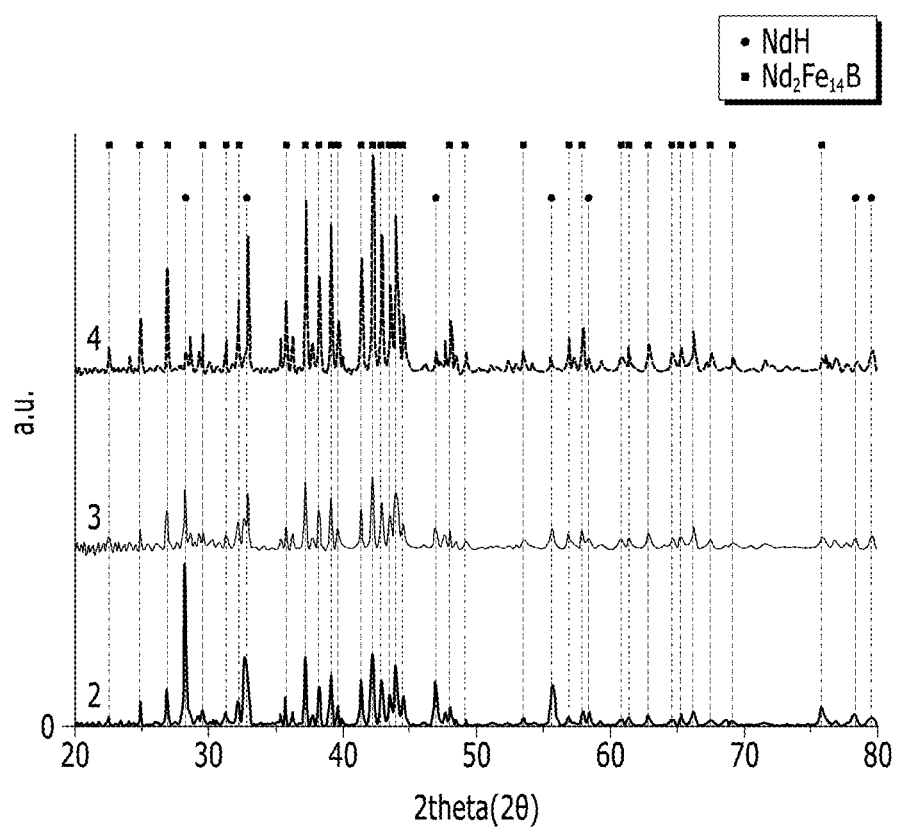
FIG. 2 is a graph illustrating XRD patterns of magnetic powders according to Examples 2 to 4.
Figure 3:
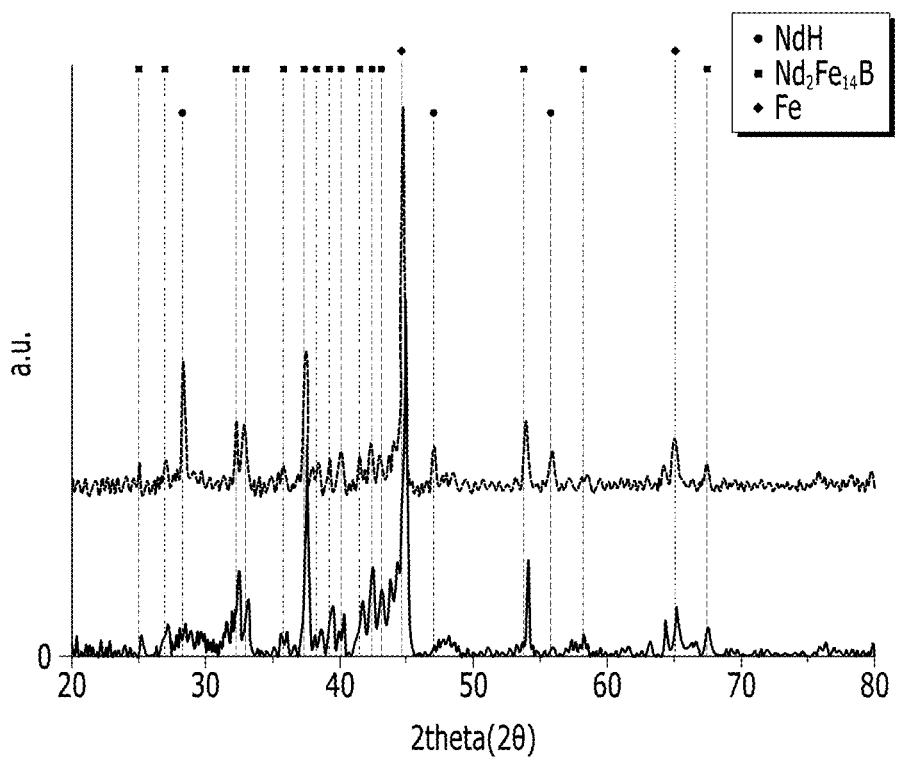
FIG. 3 is a graph illustrating XRD patterns of magnetic powders according to Comparative Examples 1 and 2.

XRD patterns for the magnetic powders produced in Examples 1 to 4 and Comparative Examples 1 and 2 were analyzed and are shown in FIGS. 1 to 3. FIG. 1 is a graph illustrating XRD patterns of iron powders after reducing iron oxide ($Fe_2O_3$) according to Examples 1 and 2 of the present invention. FIG. 2 is a graph illustrating XRD patterns of the magnetic powders according to Examples 2 to 4. FIG. 3 is a graph illustrating XRD patterns of the magnetic powders according to Comparative Examples 1 and 2.

As seen from FIG. 1, it may be confirmed that an iron powder was produced after reducing iron oxide ($Fe_2O_3$)

In Examples 2 to 4 of FIG. 2, a single phase of a $Nd_2Fe_{14}B$ powder is formed. However, in Comparative Examples 1 and 2 of FIG. 3, since pressure is excessive or insufficient when producing a molded body for reacting the magnetic powder, due to a large amount of CaO during the synthesis reaction, $Nd_2Fe_{14}B$ synthesis does not proceed, and Fe remains in a reduced powder state.

Experimental Example 2

Figure 4A:
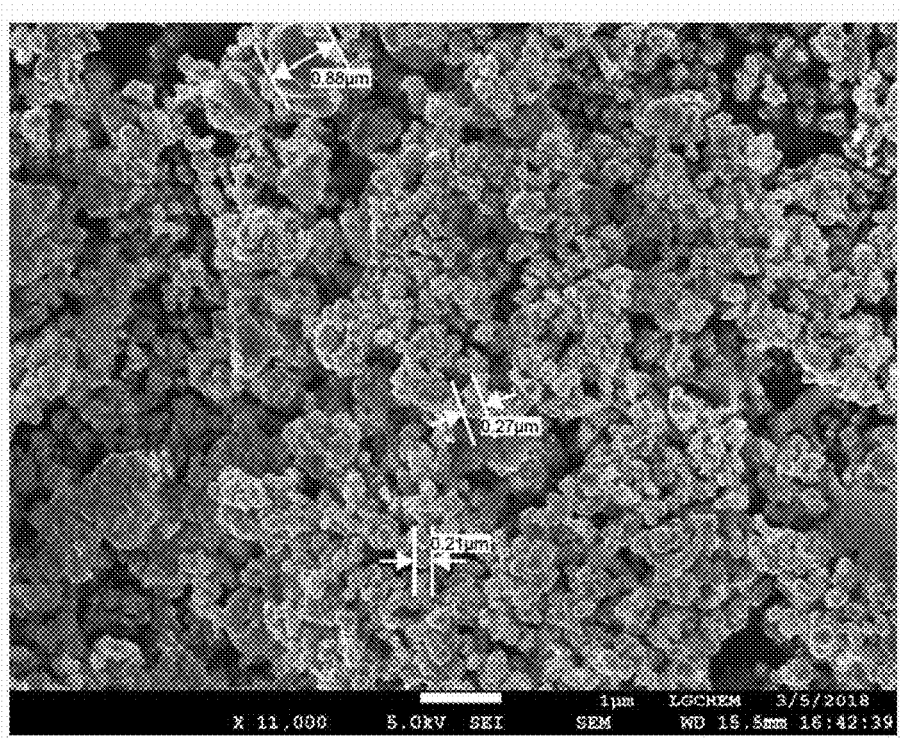
FIG. 4A is an SEM photograph of an iron powder after reducing iron oxide ($Fe_2O_3$) according to Example 1.
Figure 4B:
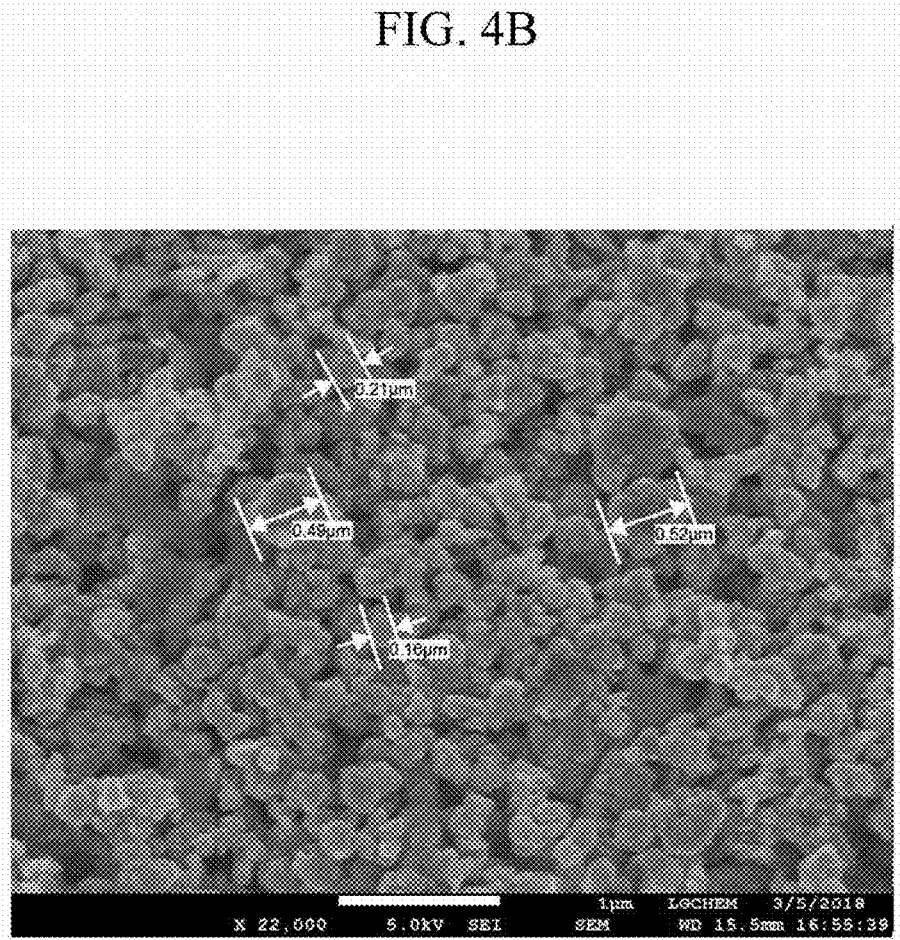
FIG. 4B is an SEM photograph represented by changing a magnification of the SEM photograph shown in FIG. 4A.
Figure 5A:
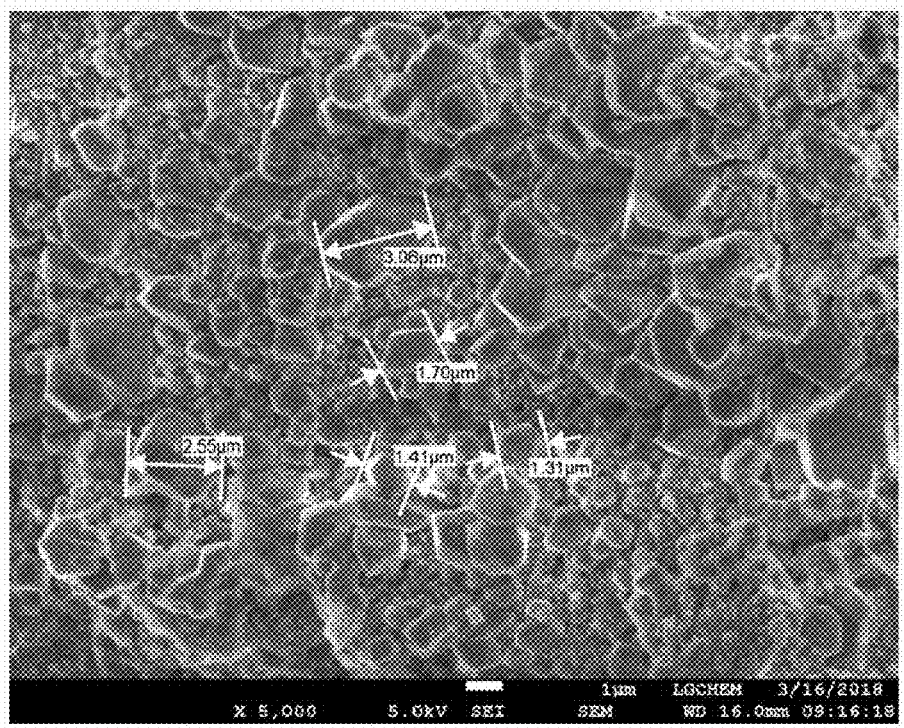
FIG. 5A is an SEM photograph of the magnetic powder according to Example 2.
Figure 5B:
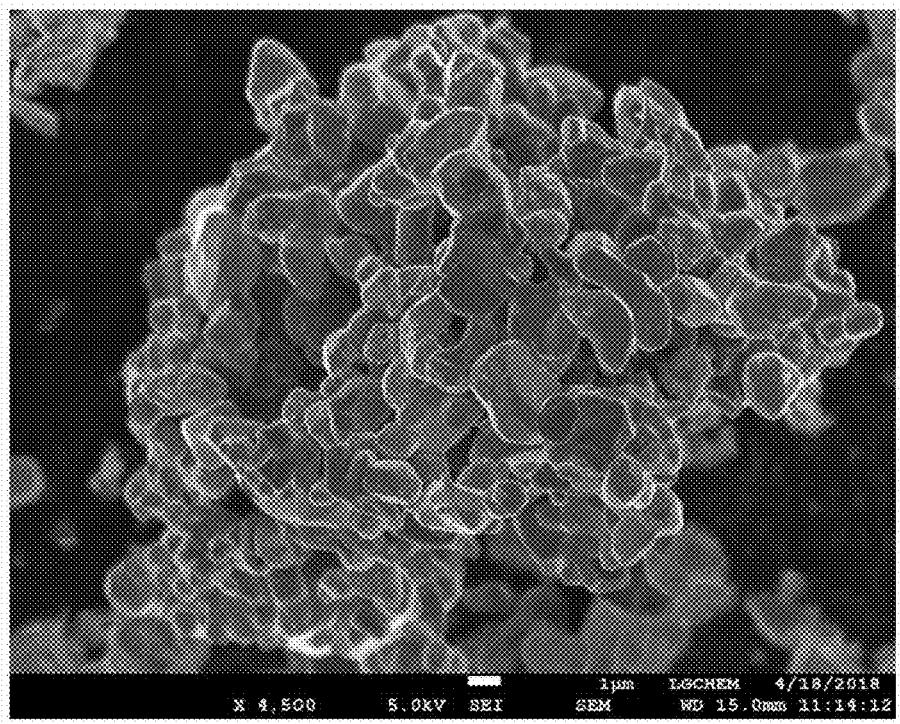
FIG. 5B is an SEM photograph represented by changing a magnification of the SEM photograph shown in FIG. 5A.

For the magnetic powders of Examples 1 and 2, the sizes were measured using a scanning electron microscope (SEM) and are shown in FIGS. 4A to 5B. FIG. 4A is an SEM photograph of the magnetic powder according to Example 1. FIG. 4B is an SEM photograph of the iron powder after reducing iron oxide ($Fe_2O_3$) according to Example 1 shown in FIG. 4A, of which the magnification was changed. FIG. 5A is an SEM photograph of the iron powder according to Example 2. FIG. 5B is an SEM photograph of the magnetic powder according to Example 2 shown in FIG. 5A, of which the magnification was changed.

As seen from FIG. 4A and FIG. 4B, it may be confirmed that in Example 1, a $Nd_2Fe_{14}B$ powder having a size of 0.16 µm to 0.88 µm was produced.

As seen from FIG. 5A and FIG. 5B, it may be confirmed that in Example 2, a $Nd_2Fe_{14}B$ powder having a size of 1.31 to 3.06 µm was produced.

Experimental Example 3

Figure 6:
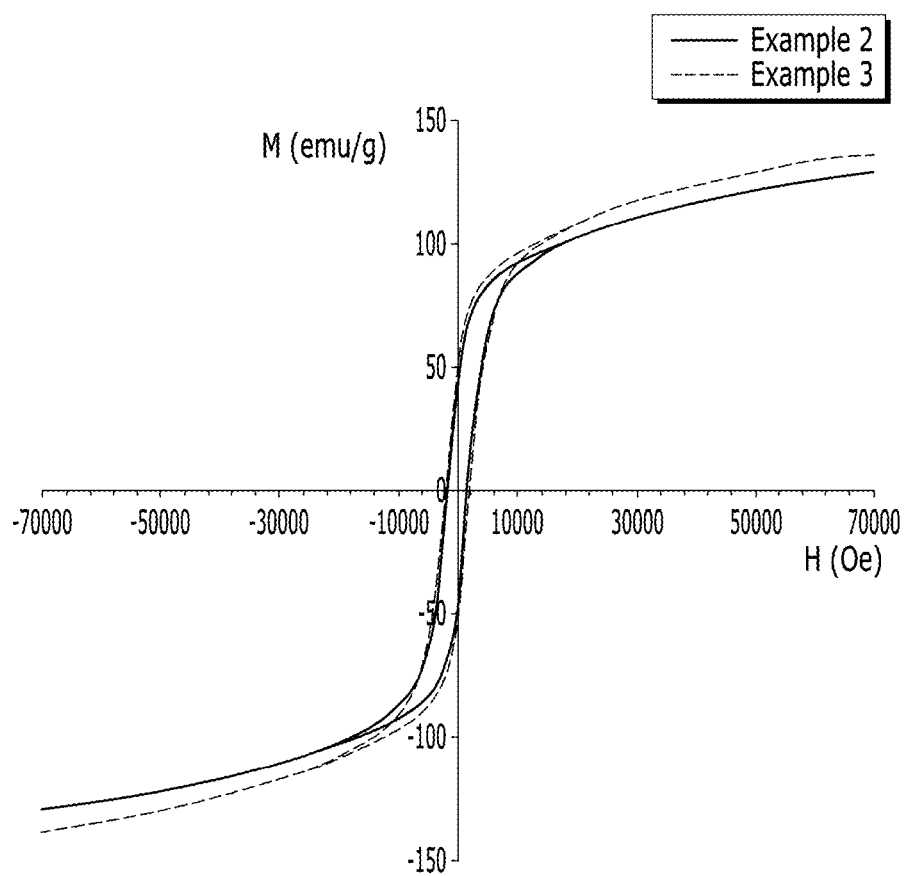
FIG. 6 is a graph illustrating M-H data of the magnetic powders according to Examples 2 and 3.
Figure 7:
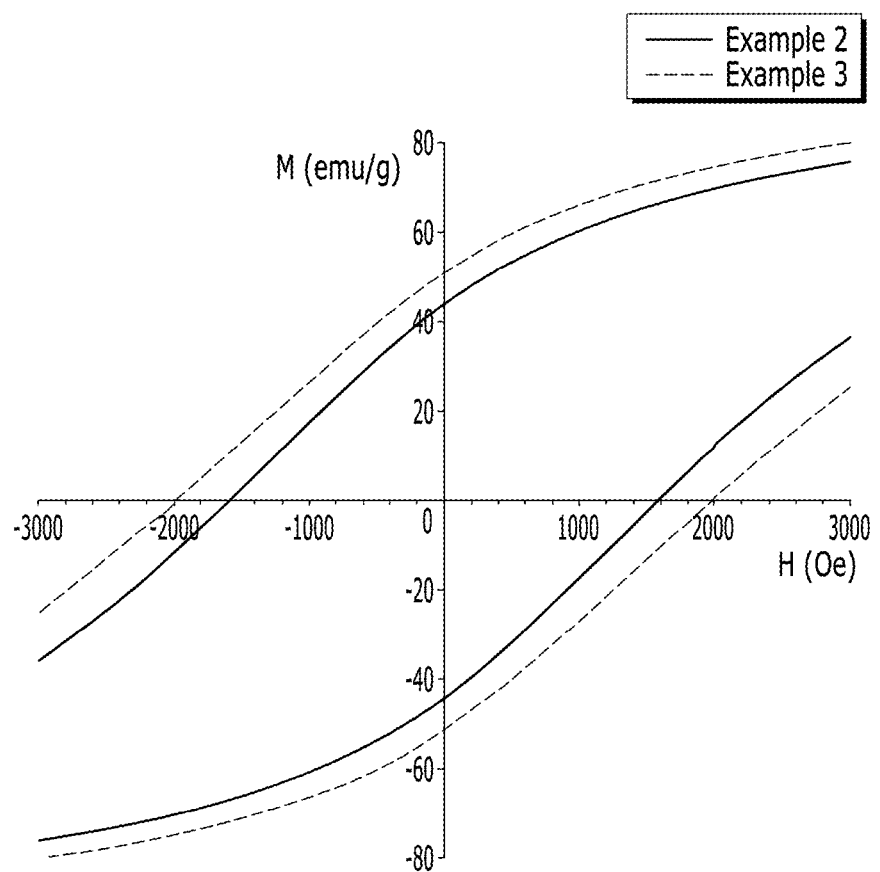
FIG. 7 is a graph represented by magnifying a starting point part of the graph illustrating the M-H data of the magnetic powders according to Examples 2 and 3.

Magnetic hysteresis (M-H) data (M-H curve) of the NdFeB powder of Examples 2 and 3 was measured and is shown in FIGS. 6 and 7. FIG. 6 is a graph illustrating the M-H data of the magnetic powders according to Examples 2 and 3. FIG. 7 is a graph represented by magnifying a starting point part of the graph illustrating the M-H data of the magnetic powders according to Examples 2 and 3.

As seen from FIGS. 6 and 7, in Examples 2 and 3 in which the magnet was produced by pressurization in a certain pressure range by an oil-hydraulic press method, a magnetic hysteresis curve of a NdFeB magnetic powder may be confirmed. In FIG. 7, x and y-intercepts are confirmed by magnifying a portion around the starting point of FIG. 6, and it was confirmed that both Examples 2 and 3 represented excellent magnetism.

Experimental Example 4

Scanning Electron Microscopic Image of Fracture Surface of Sintered Magnet

Figure 8:
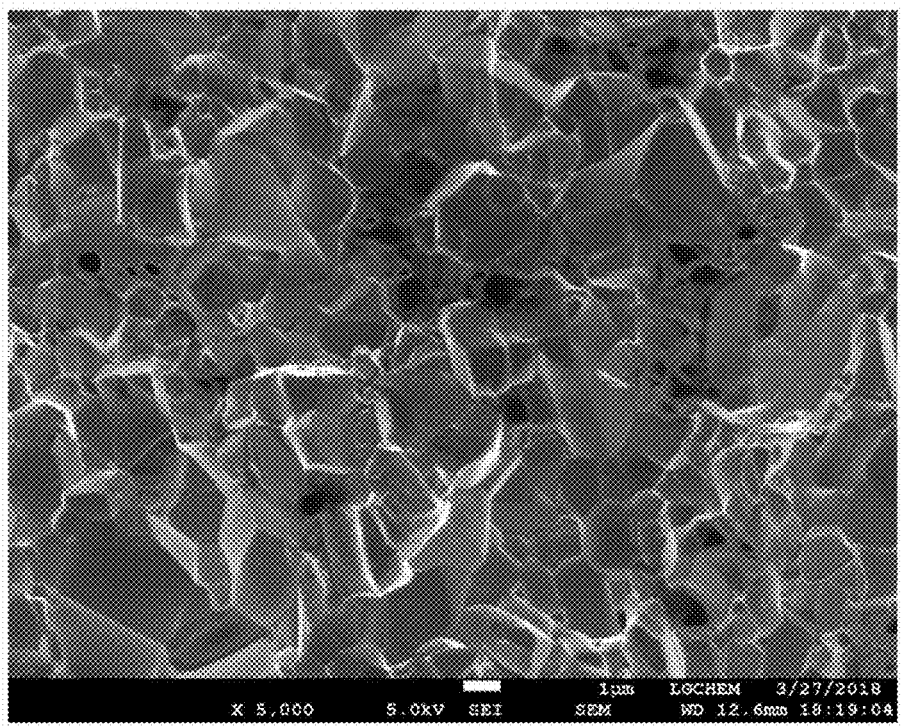
FIG. 8 is a scanning electron microscope photograph of a fracture surface of a sintered magnet produced according to Example 5.
Figure 9:
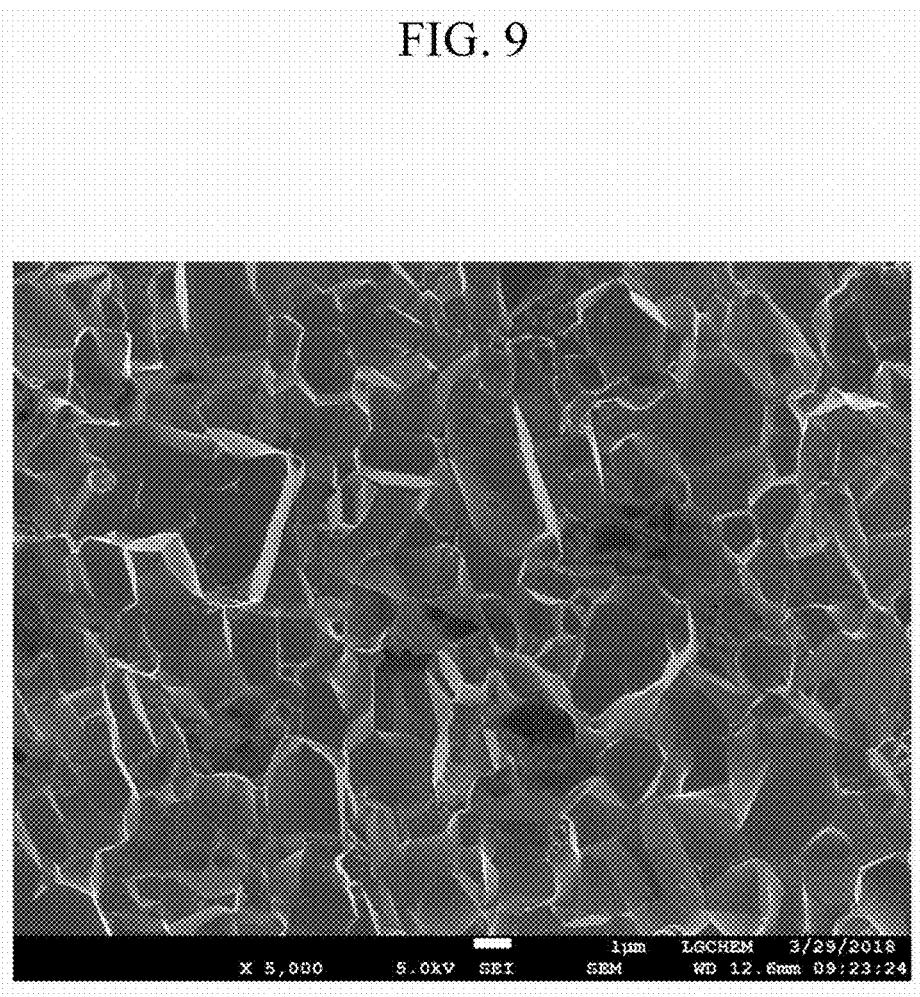
FIG. 9 is a scanning electron microscope photograph of a fracture surface of a sintered magnet produced according to Example 6.

A NdFeB-based magnetic powder obtained by pulverization and mixing in a Turbula mixer, the surface of which was coated with ammonium fluoride, according to Example 5 was heated to a temperature of 1070° C. to produce a sintered magnet, and an SEM photograph of the fracture surface of the sintered magnet is shown in FIG. 8; and a NdFeB-based magnetic powder obtained by pulverization and mixing in a Turbula mixer, the surface of which was coated with ammonium fluoride, according to Example 5 was heated to a temperature of 1090° C. to produce a sintered magnet, and an SEM photograph of the fracture surface of the sintered magnet is shown in FIG. 9. An SEM photograph of the fracture surface of the sintered magnet produced by a NdFeB-based magnetic powder of which the surface was not coated with ammonium fluoride according to Comparative Example 3 is shown in FIG. 10.

Figure 10:
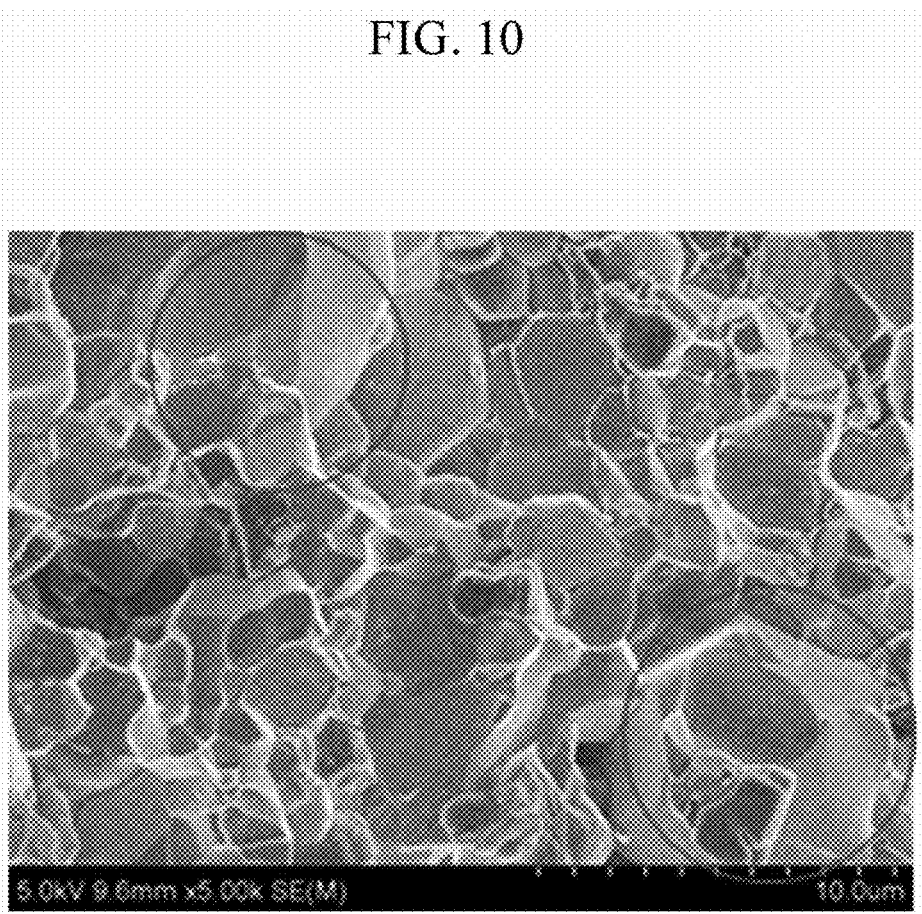
FIG. 10 is a scanning electron microscope photograph of a fracture surface of a sintered magnet produced according to Comparative Example 3.

As seen from FIG. 10, in the sintered magnet produced by the magnetic powder which was not coated with ammonium fluoride, crystal grain growth as in the indicated portion was observed, while in FIG. 8 and FIG. 9, in the sintered magnet produced with the magnetic powder coated with ammonium fluoride, crystal grain growth as in FIG. 10 was not observed. In Example 5 and Example 6, heating to a high temperature of 1070° C. and 1090° C. was performed during sintering, and it was confirmed that particle growth was actually suppressed well, and in general, when a sintering temperature is raised, a density may be improved, and an effect of increasing remaining magnetization may be also obtained by improving the density.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

The invention claimed is:

1. A method of producing a magnetic powder comprising:
    producing an iron powder by a reduction reaction of iron oxide;
    obtaining a molded body by press molding a mixture including the iron powder, a rare earth oxide, boron, and calcium at a pressure of 22 MPa or more;
    producing a magnetic powder from the molded body;
    mixing the magnetic powder with ammonium nitrate, methanol, and zirconia balls;
    pulverizing the magnetic powder with the ammonium nitrate, the methanol, and the zirconia balls; and
    coating a surface of the pulverized magnetic powder with ammonium fluoride.

2. The method of claim 1, wherein the producing of the iron powder further comprises:
    reducing a mixture of at least one of an alkali metal oxide or an alkaline earth metal oxide with iron oxide under an inert gas atmosphere, in the presence of a reducing agent.

3. The method of claim 2, wherein the mixture including the iron powder, the rare earth oxide, the boron, and the calcium is produced by adding neodymium oxide, boron, and calcium to the iron powder.

4. The method of claim 1, wherein the producing of the iron powder further comprises:
    reducing a mixture of neodymium oxide and iron oxide which has been wet-mixed under an organic solvent, in the presence of a reducing agent to produce an iron powder and neodymium oxide-containing mixture.

5. The method of claim 4, wherein the mixture including the iron powder, neodymium oxide, boron and calcium is produced by adding -boron and -calcium to the iron powder and neodymium oxide-containing mixture.

6. The method of claim 1, wherein
    a reducing agent is used in the reduction reaction of the iron oxide, and
    the reducing agent further comprises at least one of an alkali metal hydride and an alkaline earth metal hydride.

7. The method of claim 1, wherein the producing of the iron powder further comprises removing a by-product from the iron powder obtained by the reduction reaction using a quaternary ammonium-based methanol solution; and
    cleaning the iron powder from which the by-product has been removed with a solvent and drying the cleaned iron powder.

8. The method of claim 1, wherein the producing of the magnetic powder further comprises:
    heating the molded body at a temperature of 800° C. to 1,100° C. under an inert gas atmosphere.

9. The method of claim 1, wherein the press molding comprises a pressing process selected from the group consisting of oil-hydraulic pressing, tapping, and cold isostatic pressing (CIP).

10. The method of claim 1, further comprising:
after the producing of the magnetic powder,
pulverizing the molded body to obtain a powder and then removing a by-product using a quaternary ammonium-based methanol solution; and cleaning the powder from which the by-product has been removed with a solvent and drying the cleaned powder.

11. The method of claim 10, wherein the quaternary ammonium-based methanol solution comprises at least one of an ammonium nitrate methanol solution, an ammonium chloride methanol solution, or an ammonium acetate methanol solution.

12. The method of claim 1, wherein the coating with ammonium fluoride further comprises:
mixing the pulverized magnetic powder and the ammonium fluoride in an organic solvent to form a coated magnetic powder; and
drying the coated magnetic powder.

13. The method of claim 12, wherein the mixing and drying further comprises:
mixing the pulverized magnetic powder, the ammonium fluoride, and the organic solvent to form a mixture; and
pulverizing the mixture in a Turbula mixer.

14. The method of claim 12, wherein the organic solvent comprises at least one of acetone, methanol, ethanol, butanol, and normal hexane.

* * * * *